United States Patent
Tenny et al.

(10) Patent No.: US 11,528,597 B2
(45) Date of Patent: Dec. 13, 2022

(54) CARRIER AND FREQUENCY SPECIFIC CAPABILITY RESTRICTIONS

(71) Applicant: MediaTek Singapore Pte. Ltd., Singapore (SG)

(72) Inventors: Nathan Edward Tenny, San Jose, CA (US); Chia-Chun Hsu, Hsin-Chu (TW)

(73) Assignee: mediatek singapore pte ltd., Singapore (SG)

(*) Notice: Subject to any disclaimer, the term of this patent is extended or adjusted under 35 U.S.C. 154(b) by 80 days.

(21) Appl. No.: 16/565,699

(22) Filed: Sep. 10, 2019

(65) Prior Publication Data

US 2020/0100099 A1    Mar. 26, 2020

Related U.S. Application Data

(60) Provisional application No. 62/735,918, filed on Sep. 25, 2018.

(51) Int. Cl.
*H04W 8/24* (2009.01)
*H04W 88/06* (2009.01)
(Continued)

(52) U.S. Cl.
CPC ........... *H04W 8/24* (2013.01); *H04B 7/0486* (2013.01); *H04W 72/0453* (2013.01); *H04W 88/06* (2013.01)

(58) Field of Classification Search
CPC ... H04W 8/24; H04W 88/06; H04W 72/0453; Y02D 30/70
See application file for complete search history.

(56) References Cited

U.S. PATENT DOCUMENTS 8,891,458 B2    11/2014 Tenny .......................... 370/329
2018/0034524 A1    2/2018 Pao et al.
(Continued)

FOREIGN PATENT DOCUMENTS

| CN | 107659955 A | 7/2016 |
| WO | WO2018/130115 A1 | 1/2017 |
| WO | WO2018130047 A1 | 1/2017 |

OTHER PUBLICATIONS

R2-063104 3GPP TSG -RAN WG2 #56, Qualcomm Europe, "UE Capability Updates with Ongoing Service", Riga, Latvia, Nov. 10-16, 2006 (4 pages).

(Continued)

*Primary Examiner* — Omer S Mian
(74) *Attorney, Agent, or Firm* — Imperium Patent Works; Zheng Jin

(57) ABSTRACT

A method for UE capability reduction on a per-component-carrier or a per-frequency-range basis is proposed. In NR networks, UE may be operating in multiple frequency ranges (FRs) and configured with multiple component carriers (CCs) under carrier aggregation. UE can detect an overheating problem due to the RF activity supporting high bandwidth or high MIMO rank on a specific FR or a specific CC. Accordingly, UE indicates to the network a preference for a capability reduction on the specific FR or the specific CC, e.g., a reduced number of carriers, a reduced maximum bandwidth, or a reduced MIMO rank. Such per-FR or per-CC request allows UE to restrict or reduce its capability in a manner that is specific to certain component carriers and/or certain frequency ranges rather than to a global capability reduction that affects all carriers/frequencies.

14 Claims, 4 Drawing Sheets

(51) Int. Cl.
*H04W 72/04* (2009.01)
*H04B 7/0456* (2017.01)

(56) References Cited

U.S. PATENT DOCUMENTS

| | | | |
|---|---|---|---|
| 2018/0035438 A1 | 2/2018 | Pao et al. | |
| 2018/0199185 A1 | 7/2018 | Tenny et al. | |
| 2019/0021088 A1* | 1/2019 | Zhang | H04L 1/1614 |
| 2019/0222404 A1* | 7/2019 | Ang | H04L 5/0098 |
| 2020/0128479 A1* | 4/2020 | Xu | H04W 8/24 |
| 2020/0351638 A1* | 11/2020 | Kim | H04W 8/005 |
| 2021/0083730 A1* | 3/2021 | Hwang | H04B 7/0408 |

OTHER PUBLICATIONS

R2-074734 3GPP TSG-RAN WG2 #60, Qualcomm Europe et al., "Update and draft CR on change of UE capability during an RRC connection", Jeju, Korea, Nov. 5-9, 2007 (40 pages).

R2-083878 3GPP TSG-RAN WG2 #63, Qualcomm Europe, "UE capability updates while attached", Jeju, Korea, Aug. 18-22, 2008 (5 pages).

R2-103168 3GPP TSG RAN Wg2 #70, Philips, "Operating Profiles for UE", Montreal, Canada, May 10-14 (3 pages).

R2-1714009 3GPP TSG-RAN WG2 Meeting #100, Huawei device et al., "Introduction of the overheating indication", Reno, Nevada, USA, Nov. 27-Dec. 1, 2017 (2 pages).

R2-1714010 3GPP TSG-RAN WG2 Meeting #100, Huawei device et al., "Introduction of the overheating indication", Reno, Nevada, USA, Nov. 27-Dec. 1, 2017 (60 pages).

International Search Report and Written Opinion of International Search Authority for PCT/US2019/106413 dated Dec. 18, 2019 (9 pages).

R2-1802415 3GPP TSG-RAN2 WG2 Meeting #101, Apple Inc., "UE overheating for EN-DC", Athens, Greece, Feb. 26-Mar. 2, 2018 (10 pages) *section 5.6.10.3*.

R2-1808611 3GPP TSG-RAN WG2 Meeting #102, LG Electronics Inc. "Zone based Flight Path Reporting", Busan, Korea, May 21-25, 2018 (11 pages) *section 5.6.10.3*.

Taiwan IPO, office action for related TW patent application 108133333 (no English translation is available) dated May 29, 2020 (10 pages).

R2-1811129 3GPP TSG-RAN WG2 Meeting #1807, Qualcomm Incorporated, Temporary Capability Restriction for standalone NR, Gothenburg, Sweden, Aug. 20-24, 2018 (4 pages) *pp. 1-3*.

Taiwan IPO, office action for related TW patent application 108133333 (no English translation is available) dated Jun. 25, 2021 (5 pages).

* cited by examiner

```
UEAssistanceInformation-IEs ::=    SEQUENCE {                                    510
    capabilityReductionRequest         CapabilityReductionRequest,
    lateNonCriticalExtension           OCTET STRING
                                       OPTIONAL,
    nonCriticalExtension               SEQUENCE{}
                                       OPTIONAL
}
```

```
CapabilityReductionRequest ::= SEQUENCE {                                        520
    reductionRequestPerUE      ReductionRequestPerUE
                               OPTIONAL,
    reductionRequestFRX        SEQUENCE (SIZE (1..2)) OF
ReductionRequestFRX            OPTIONAL,
    reductionRequestPerCC      SEQUENCE (SIZE (1..maxNrofServingCells)) OF
ReductionRequestPerCC          OPTIONAL
}
```

FIG. 5

```
ReductionRequestFRX ::= SEQUENCE {                                               610
    frequencyRange      ENUMERATED { fr1, fr2 },
    maxNumCarriers      INTEGER (0..maxNrofServingCells)   OPTIONAL,
    maxBW-DL            SupportedBandwidth                 OPTIONAL,
    maxBW-UL            SupportedBandwidth                 OPTIONAL,
    maxMIMO-RankDL      MIMO-LayersDL                      OPTIONAL,
    maxMIMO-RankUL      MIMO-LayersUL                      OPTIONAL
}
```

```
ReductionRequestPerCC ::= SEQUENCE {                                             620
    maxBW-DL            SupportedBandwidth                 OPTIONAL,
    maxBW-UL            SupportedBandwidth                 OPTIONAL,
    maxMIMO-RankDL      MIMO-LayersDL                      OPTIONAL,
    maxMIMO-RankUL      MIMO-LayersUL                      OPTIONAL
}
```

FIG. 6

CARRIER AND FREQUENCY SPECIFIC CAPABILITY RESTRICTIONS

CROSS REFERENCE TO RELATED APPLICATIONS

This application claims priority under 35 U.S.C. § 119 from U.S. Provisional Application No. 62/735,918, entitled "Carrier- and Frequency-Specific Capability Restrictions", filed on Sep. 25, 2018, the subject matter of which is incorporated herein by reference.

TECHNICAL FIELD

The disclosed embodiments relate generally to wireless communication, and, more particularly, to method of carrier-specific and frequency-specific UE capability restrictions in LTE and NR systems.

BACKGROUND

The wireless communications network has grown exponentially over the years. A Long-Term Evolution (LTE) system offers high peak data rates, low latency, improved system capacity, and low operating cost resulting from simplified network architecture. LTE systems, also known as the 4G system, also provide seamless integration to older wireless networks, such as GSM, CDMA and Universal Mobile Telecommunication System (UMTS). In LTE systems, an evolved universal terrestrial radio access network (E-UTRAN) includes a plurality of evolved Node-Bs (eNodeBs or eNBs) communicating with a plurality of mobile stations, referred to as user equipments (UEs). The $3^{rd}$ generation partnership project (3GPP) network normally includes a hybrid of 2G/3G/4G systems. With the optimization of the network design, many improvements have developed over the evolution of various standards. The Next. Generation Mobile Network (NGMN) board, has decided to focus the future NGMN activities on defining the end-to-end requirements for 5G new radio (N) systems (5GS).

In LTE, the UE is allowed to request a reduction in its operating configuration in order to prevent overheating. The reduction can affect the UE category, MIMO rank, and/or number of aggregated carriers. The basic mechanism is that the UE sends an informative message (UEAssistanceInformation) to the network containing an indication of the overheating problem, and a request from the UE as to which parameters should be reduced. It is then up to network implementation to reconfigure the UE in a way the network deems appropriate, i.e., there is no guarantee that the requested configuration will be used. If the network does not reconfigure the UE, it is expected that the UE will use implementation-specific measures outside the standard, up to thermal shutdown, in order to maintain a safe operating temperature.

In NR, it is fairly clear that there will be a need for a similar mechanism. Frequency bands for 5G NR are being separated into two different frequency ranges. Frequency Range 1 (FR1) includes sub-6 GHz frequency bands, some of which are bands traditionally used by previous standards, but has been extended to cover potential new spectrum offerings from 410 MHz to 7125 MHz. Frequency Range 2 (FR2) includes frequency bands from 24.25 GHz to 52.6 GHz. Bands in FR2 in this millimeter wave range have shorter range but higher available bandwidth than bands in FR1. Furthermore, the NR peak rate requirement can be up to 20 Gbps, which is more than ten times that of LTE. As a result, the high data rates and large operating bandwidths of the 5G system can be expected to give rise to overheating problems that will need to be mitigated. Accordingly, the 3GPP RAN plenary has given guidance to the 3GPP RAN2 working group to design a thermal mitigation mechanism for NR, using the existing LTE mechanism as a baseline.

The UE capability reduction mechanism in LTE only applies per UE. There is no way to reduce the UE's capability for specific frequency ranges or specific component carriers. Since the carrier bandwidth and MIMO capabilities in NR are signaled per component carrier, this is somewhat counter to the capability structure. Further, it reduces the flexibility of the capability reduction mechanism, especially when considered in NR where there are significant differences between the FR1 and FR2 frequency ranges (which would typically operate with independent RF hardware). A solution is sought.

SUMMARY

A method for UE capability reduction on a per-component-carrier or a per-frequency-range basis is proposed. In NR networks, UE may be operating in multiple frequency ranges (FRs) and configured with multiple component carriers (CCs) under carrier aggregation. UE can detect an overheating problem due to the RF and data processing activity supporting high bandwidth or high MIMO rank on a specific FR or a specific CC. Accordingly, UE indicates to the network a preference for a capability reduction on the specific FR or the specific CC, e.g., a reduced number of carriers, a reduced maximum bandwidth, or a reduced MIMO rank. Such per-FR or per-CC request allows UE to restrict or reduce its capability in a manner that is specific to certain component carriers and/or certain frequency ranges rather than to a global capability reduction that affects all carriers/frequencies.

In one embodiment, a UE operates on a plurality of frequencies in a wireless communication network. The UE detects an overheating condition. The UE transmits an information message to the network in response to the detected overheating condition related to at least one frequency of the plurality of frequencies. The information message comprises a request for a capability reduction related to the at least one frequency of the plurality of frequencies. The request for capability reduction includes an indication of the frequency for which the capability reduction is requested. The UE receives a reconfiguration from the network and operates with a reduced capability related to the indicated frequency for which the capability reduction is requested.

Other embodiments and advantages are described in the detailed description below. This summary does not purport to define the invention. The invention is defined by the claims.

BRIEF DESCRIPTION OF THE DRAWINGS

FIG. 5 illustrates examples of UE assistance information with capability reduction request using ASN.1 in accordance with one novel aspect.

FIG. 6 illustrates examples of UE capability reduction request per frequency range and component carrier using ASN.1 in accordance with one novel aspect.

DETAILED DESCRIPTION

Reference will now be made in detail to some embodiments of the invention, examples of which are illustrated in the accompanying drawings.

Figure 1:
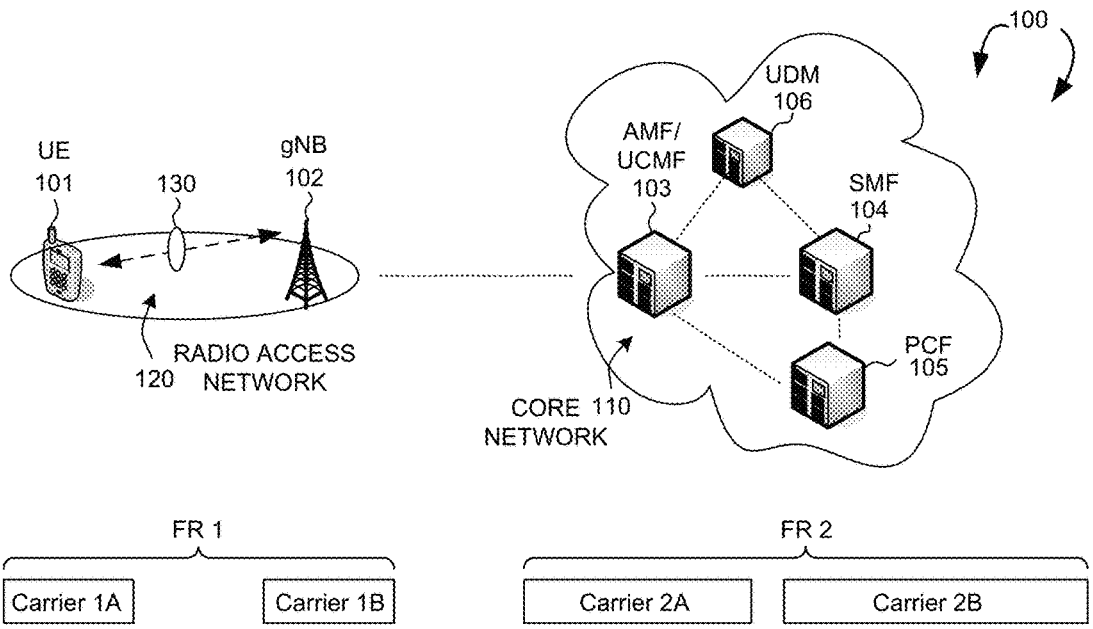
FIG. 1 schematically shows a Public Land Mobile Network (PLMN) having a core network and a radio access network (RAN) supporting carrier-specific and frequency-specific UE capability restriction in accordance with one novel aspect.

FIG. 1 schematically shows a Public Land Mobile Network (PLMN) 100 having a core network 110 and a radio access network (RAN) 120 supporting carrier-specific and frequency-specific UE capability restriction in accordance with one novel aspect. 5G new radio (NR) network 100 comprises a user equipment UE 101, a base station gNB 102, an access and mobility management function (AMF) 103, a session management function (SMF) 104, a policy control function (PCF) 105, and a unified data management (UDM) 106. In the example of FIG. 1, UE 101 and its serving base station gNB 102 belong to part of a radio access network RAN 120. In Access Stratum (AS) layer, RAN 120 provides radio access for UE 101 via a radio access technology (RAT). In Non-Access Stratum (NAS) layer, AMF 103 communicates with gNB 102 and 5G core 110 for access and mobility management of wireless access devices in 5G network 100. AMF 103 may further include a UE Capability Management Function (UCMF). UE 101 may be equipped with a radio frequency (RF) transceiver or multiple RF transceivers for different application services via different RATs/CNs. UE 101 may be a smart phone, a wearable device, an Internet of Things (IoT) device, and a tablet, etc.

In LTE, the UE is allowed to request a reduction in its operating configuration in order to prevent overheating. The reduction can affect the UE category, MIMO rank, and/or number of aggregated carriers. The basic mechanism is that the UE sends an informative message (UEAssistanceInformation) to the network containing an indication of the overheating problem, and a request from the UE as to which parameters should be reduced. In NR, it is fairly clear that there will be a need for a similar mechanism of UE capability reduction. Frequency bands for 5G NR are being separated into two different frequency ranges. Frequency Range 1 (FR1) includes sub-6 GHz frequency bands, while Frequency Range 2 (FR2) includes frequency bands from 24.25 GHz to 52.6 GHz, some or all of which may also be described as "millimeter wave" bands. Bands in FR2 in millimeter wave have shorter range but higher available bandwidth than bands in FR1.

The high data rates and large operating bandwidths of the 5G system can be expected to give rise to overheating problems that will need to be mitigated. However, the UE capability reduction mechanism in LTE only applies per UE. There is no way to reduce the UE's capability for specific frequency ranges or for specific component carriers. Since the carrier bandwidth and MIMO capabilities in NR are signaled per component carrier, this is somewhat counter to the capability structure. Further, the per UE solution reduces the flexibility of the capability reduction mechanism, especially when considered in NR where there are significant differences between the FR1 and FR2 frequency ranges, which would typically operate with independent RF hardware.

In accordance with one novel aspect, a method of UE capability restriction or reduction that is specific to certain carriers and/or certain frequency ranges is proposed. In the example of FIG. 1, consider UE 101 is operating in both FR1 (configured with carrier 1A and carrier 1B) and FR2 (configured with carrier 2A and carrier 2B), e.g., by carrier aggregation or dual connectivity. In a first example, UE 101 detects an overheating problem due to the RF activity on FR2 specifically. Accordingly, UE 101 indicates the network a preference for a reduction in the number of carriers on FR2. In another example, UE 101 detects an overheating problem due to the high bandwidth of carrier 2B rather than to the aggregation of two carriers on FR2. In this case, UE 101 indicates the network a request for a lower maximum bandwidth on carrier 2B. Such per-FR or per-CC request allows UE 101 to restrict or reduce its capability in a manner that is specific to certain carriers and/or certain frequency ranges rather than to a global capability reduction that affects all carriers/frequencies.

Figure 2:
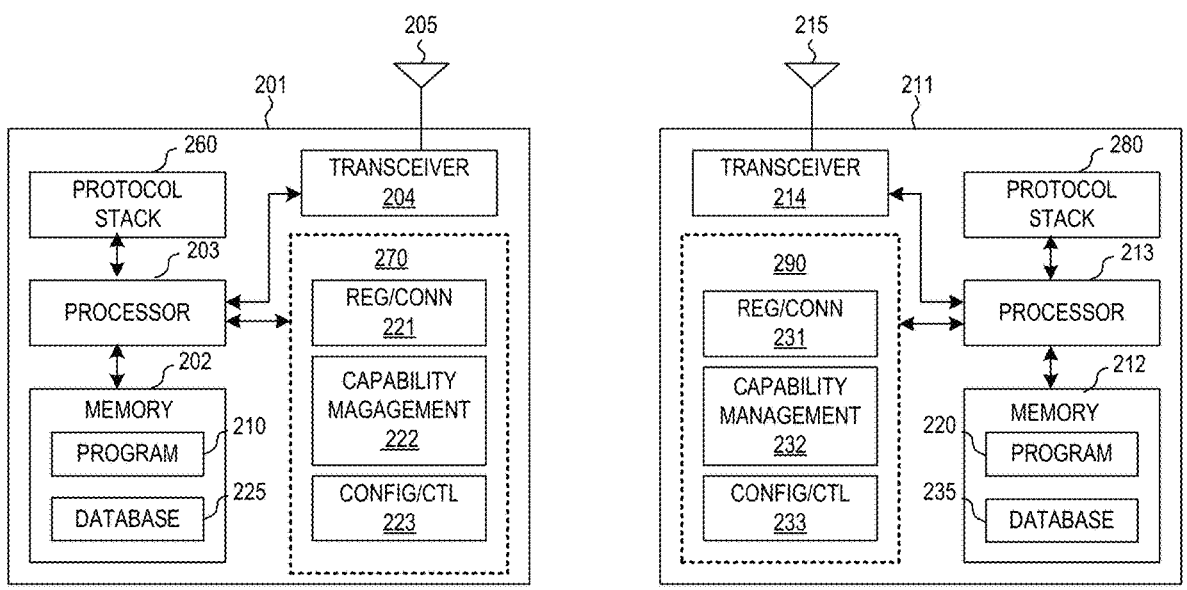
FIG. 2 illustrates simplified block diagrams of a user equipment and a network entity in accordance with embodiments of the current invention.

FIG. 2 illustrates simplified block diagrams of wireless devices, e.g., a UE 201 and network entity 211 in accordance with embodiments of the current invention. Network entity 211 may be a base station combined with an MME or AMF and/or additional elements of a CN, such as a UE Capability Management Function (UCMF). Network entity 211 has an antenna 215, which transmits and receives radio signals. A radio frequency RF transceiver module 214, coupled with the antenna, receives RF signals from antenna 215, converts them to baseband signals and sends them to processor 213. RF transceiver 214 also converts received baseband signals from processor 213, converts them to RF signals, and sends out to antenna 215. Processor 213 processes the received baseband signals and invokes different functional modules to perform features in base station 211. Memory 212 stores program instructions and data 220 to control the operations of base station 211. In the example of FIG. 2, network entity 211 also includes a set of control functional modules and circuit 290. Registration and connection handling circuit 231 handles registration and connection establishment procedure. Capability management circuit 232 handles capability management functionalities including UE capability reconfiguration (e.g., to restrict or reduce certain UE capability) based, for example, on UE assistance information. Configuration and control circuit 233 provides different parameters to configure and control UE operation including carrier aggregation.

Similarly, UE 201 has memory 202, a processor 203, and radio frequency (RF) transceiver module 204. RF transceiver 204 is coupled with antenna 205, receives RF signals from antenna 205, converts them to baseband signals, and sends them to processor 203. RF transceiver 204 also converts received baseband signals from processor 203, converts them to RF signals, and sends them out to antenna 205. Processor 203 processes the received baseband signals and invokes different functional modules and circuits to perform features in UE 201. Memory 202 stores data and program instructions 210 to be executed by the processor to control the operations of UE 201. Suitable processors include, by way of example, a special purpose processor, a digital signal processor (DSP), a plurality of micro-processors, one or more micro-processor associated with a DSP core, a controller, a microcontroller, application specific integrated circuits (ASICs), field programmable gate array (FPGA) circuits, and other types of integrated circuits (ICs), and/or state machines. A processor in associated with software may be used to implement and configure features of UE 201.

UE 201 also comprises a set of functional modules and control circuits to carry out functional tasks of UE 201. Protocol stacks 260 comprise Non-Access-Stratum (NAS) layer to communicate with an MME or an AMF entity connecting to the core network, Radio Resource Control (RRC) layer for high layer configuration and control, Packet Data Convergence Protocol/Radio Link Control (PDCP/RLC) layer, Media Access Control (MAC) layer, and Physical (PHY) layer. System modules and circuits 270 may be implemented and configured by software, firmware, hardware, and/or combination thereof. The function modules and circuits, when executed by the processors via program instructions contained in the memory, interwork with each other to allow UE 201 to perform embodiments and functional tasks and features in the network. In one example, system modules and circuits 270 comprise registration and connection handling module 221 that performs registration and connection establishment procedure with the network, a capability management module 222 that handles capability management functionalities including detecting overheating conditions and providing UE assistance information to the network for UE capability restriction or reduction on a per-CC or per-FR basis, and a configuration and control module 223 that handles configuration and control parameters including carrier aggregation. In one example, UE 201 requests for UE capability reduction by providing UE assistance information and indicating to the network a reduction in capability parameters on a specific FR or CC that causes the overheating.

Figure 3:
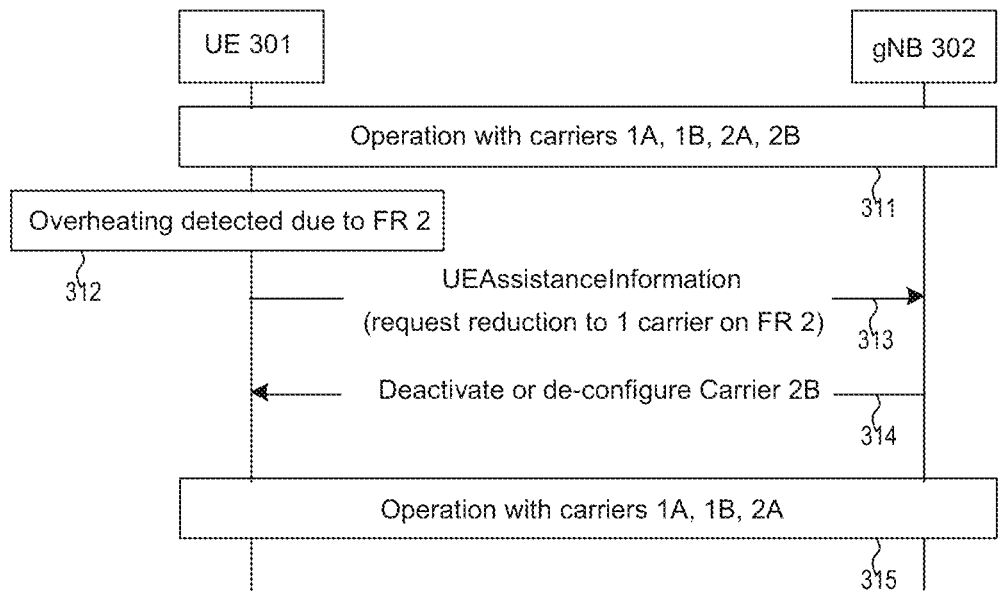
FIG. 3 illustrates one embodiment of message flow for reducing carrier aggregation on FR2 only in accordance with one novel aspect.

FIG. 3 illustrates one embodiment of message flow for reducing carrier aggregation on FR2 only in accordance with one novel aspect. In step 311, UE 301 establishes a connection with gNB 302 and operates over both FR1 and FR2, where UE 301 is configured with CC 1A and CC 1B on FR1, and is configured with CC 2A and CC 2B on FR2. In step 312, UE 301 detects an overheating condition, due to the operation on FR2. This is a reasonable scenario due to the larger bandwidth offerings and high data rates on FR2, which could cause overheating on the FR2 RF chain while the FR1 RF chain remains in good condition. When UE 301 experiences overheating on FR2, UE 301 may wish to reduce operation to a single carrier on FR2, while still being able to maintain operation with the two carriers on FR1. As a result, in step 313, UE 301 sends UE assistance information to gNB 302. The UE assistance information includes a request to reduce to one carrier on FR2. The request comprises an indication that FR2 causes the overheating, and may further comprise an indication that CC 2B is the offending carrier. In step 314, in response to the request, gNB 302 may send a response back to UE 301, which de-activates the offending carrier 2B (e.g., by lower layer signaling such as MAC or PHY), or de-configures the offending carrier 2B (e.g., by upper layer signaling such as RRC). In step 315, UE 301 continues operation over carriers 1A, 1B, and 2A.

Figure 4:
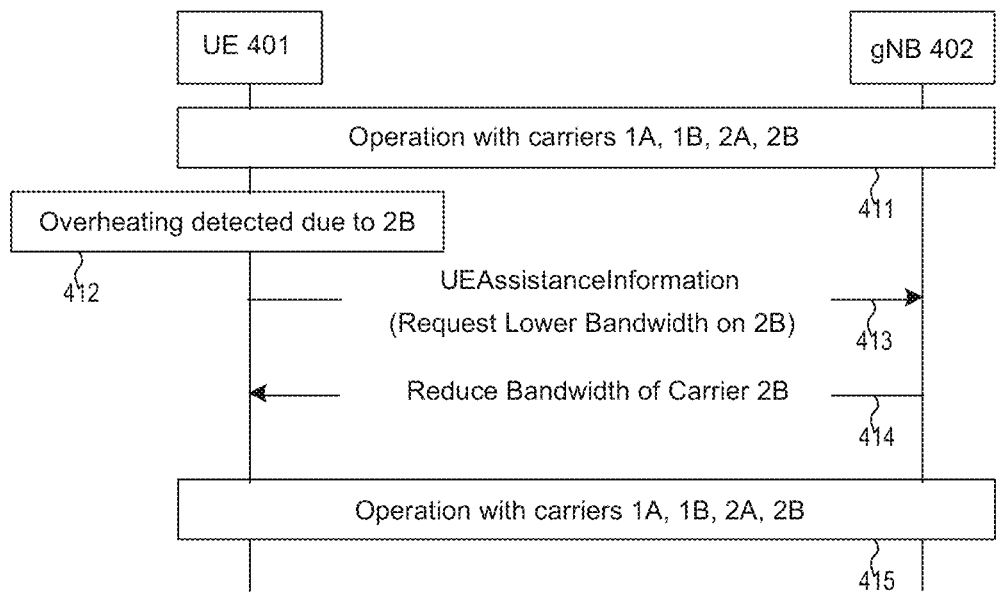
FIG. 4 illustrates one embodiment of message flow for reducing bandwidth on carrier 2B only in accordance with one novel aspect.

FIG. 4 illustrates one embodiment of message flow for reducing bandwidth on carrier 2B only in accordance with one novel aspect. In step 411, UE 401 establishes a connection with gNB 402 and operates over both FR1 and FR2, where UE 402 is configured with CC 1A and CC 1B on FR1, and is configured with CC 2A and CC 2B on FR2. In step 412, UE 401 detects an overheating condition, due to the high bandwidth of carrier 2B rather than to the aggregation of the two carriers on FR2. In this case, UE 401 may wish to indicate a request for a lower maximum bandwidth on carrier 2B. As a result, in step 413, UE 401 sends UE assistance information to gNB 402. The UE assistance information includes a request to reduce to the maximum bandwidth on carrier 2B. In step 414, in response to the request, gNB 402 sends a response back to UE 401, which reduces the maximum bandwidth of carrier 2B. In step 415, UE 401 continues operation over carriers 1A, 1B, 2A, and 2B (with reduced maximum bandwidth). Here the network response in step 414 may comprise a reconfiguration (e.g. by RRC signalling) of carrier 2B to have a lower bandwidth, or switching (e.g. by MAC or PHY signalling) to a narrower bandwidth part (BWP) on carrier 2B. The network may also decide to take other more drastic measures such as de-configuring or deactivating the entire carrier 2B. This is a matter of network implementation and the network is free to change the configuration whenever it considers it necessary.

The message indicated as UE Assistance Information is conceived as a message of the RRC protocol, although in principle other protocols could be used. The message may be a special-purpose message dedicated to thermal mitigation, or a more general message such as LTE's UE Assistance Information message (which, as the name may suggest, carries a variety of information that the UE provides as "assistance" for the network to configure it in various ways). Alternatively, the UE capability signalling could be used. For instance, the UE could send a UE capability structure containing the changed fields, and the network would be responsible for inferring what the change in UE capability means relative to the UE's current configuration.

Similar sequence flows to FIG. 3 and FIG. 4 could be applied to the reduction of other fields for per-carrier or per-frequency-range UE capability reduction, notably the maximum multiple-input multiple-output (MIMO) rank. Currently in the UE capability, the maximum supported MIMO rank is indicated per-CC as part of the UE capability structure FeatureSetDownlinkPerCC (DL case) or FeatureSetUplinkPerCC (UL case). Therefore, UE could request a reduction in the MIMO rank also on a per-carrier basis. However, frequency-range-specific signalling also could be devised to allow a request for a reduction in MIMO rank on a per-frequency-range basis as well.

In accordance with one novel aspect, the signalling of a per-frequency or per-carrier request for UE capability reduction may use signalling formats similar to the existing UE capability structure. For instance, the UE capability signalling already includes the fields such as FeatureSetDownlinkPerCC and FeatureSetUplinkPerCC, which contain capability parameters that are configured per component carrier. Therefore, the message sent by the UE to request a capability reduction (e.g. the UE Assistance Information message) could contain one or more similar structures, which might contain some or all of the same parameters as the fields currently defined in the UE capability structure.

FIG. 5 illustrates examples of UE assistance information with capability reduction request using Abstract Syntax Notation One (ASN.1) in accordance with one novel aspect. As depicted by 510 of FIG. 5, the UE Assistance Information IE contains a Capability Reduction Request. As depicted by 520 of FIG. 5, the Capability Reduction Request further contains three fields: 1) a reduction request per UE; 2) a reduction request per frequency range; and 3) a reduction request per component carrier. The reduction request per component carrier may comprise a list in correspondence with the CCs with which the UE is configured, for example, a list of serving cells in which each serving cell corresponds to a single CC. Each entry in the list may represent a requested reduction of operating capability on the corresponding carrier. In some embodiments, each entry in the list may include an indication of which frequency the reconfiguration is requested for; such an indication may, for example, take the form of an indicated position in the UE's list of serving cells. In other embodiments, each entry in the list may be implicitly associated with a particular frequency based on its position in the list; for example, a UE configured with three CCs may always send a list of three entries for requested reductions, with the salient fields of the message omitted in those entries for which no actual reduction is needed.

FIG. 6 illustrates examples of UE capability reduction request per frequency range and component carrier using ASN.1 in accordance with one novel aspect. As depicted by 610 of FIG. 6, the Reduction Request per FR contains an index to the frequency range, a maximum number of carriers, a maximum bandwidth for DL, a maximum bandwidth for UL, a maximum MIMO Rank for DL, and a maximum MIMO Rank for UL. As depicted by 620 of FIG. 6, the Reduction Request per CC contains a maximum bandwidth for DL, a maximum bandwidth for UL, a maximum MIMO Rank for DL, and a maximum MIMO Rank for UL.

Figure 7:
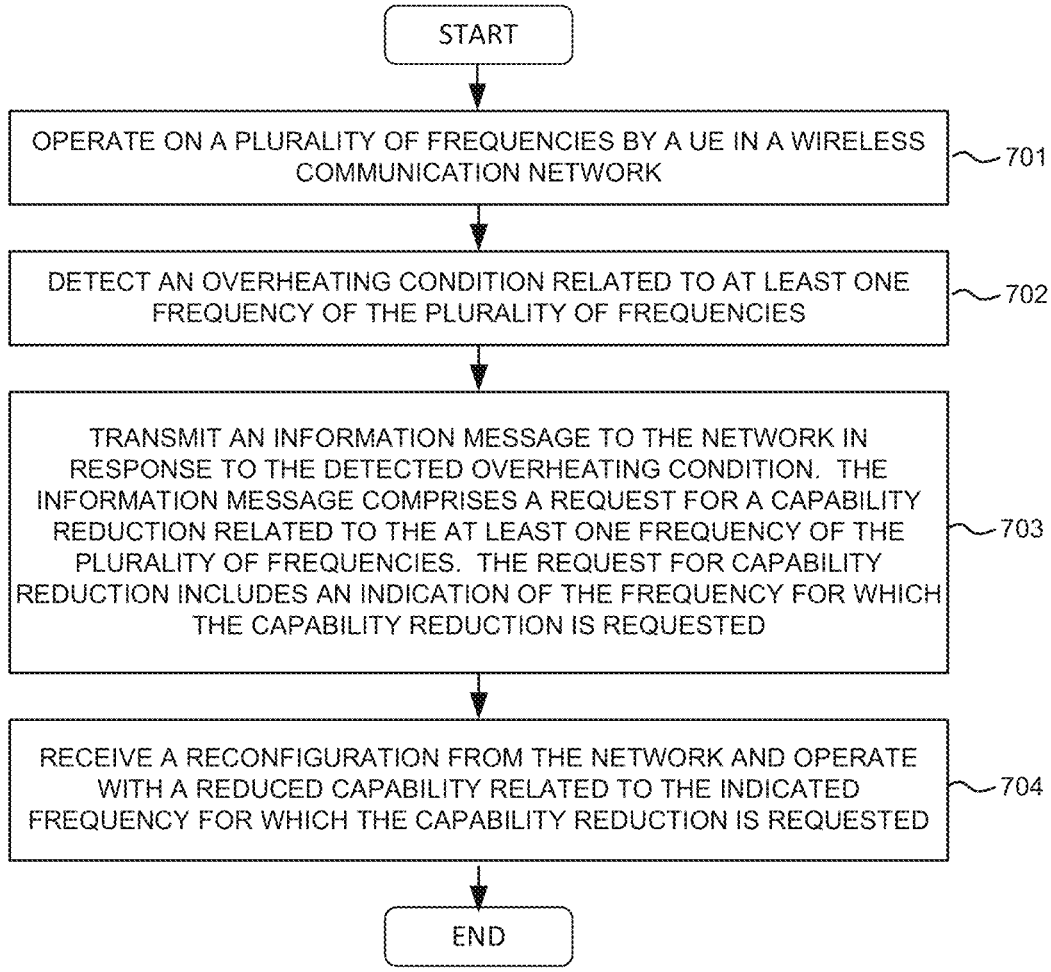
FIG. 7 is a flow chart of a method of frequency and carrier-specific UE capability restriction in accordance with one novel aspect.

FIG. 7 is a flow chart of a method of frequency and carrier-specific UE capability restriction in accordance with one novel aspect. In step 701, a UE operates on a plurality of frequencies in a wireless communication network. In step 702, the UE detects an overheating condition related to at least one frequency of the plurality of frequencies. In step 703, the UE transmits an information message to the network in response to the detected overheating condition. The information message comprises a request for a capability reduction related to the at least one frequency of the plurality of frequencies. The request for capability reduction includes an indication of the frequency for which the capability reduction is requested. In step 704, the UE receives a reconfiguration from the network and operates with a reduced capability related to the indicated frequency for which the capability reduction is requested.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising: operating on a plurality of non-overlapping frequency ranges of a radio access technology (RAT) by a user equipment (UE) in a wireless communication network, wherein each frequency range covers a plurality of frequency bands for the operation in the same RAT by the UE, wherein each frequency band covers a plurality of component carriers (CCs), and wherein at least one CC covers a plurality of bandwidth parts (BWPs) in frequency domain, and wherein each of the plurality of CCs of one of the plurality of non-overlapping frequency ranges have a shorter range and higher available channel bandwidth than each of the plurality of CCs of another one of the plurality of non-overlapping frequency ranges;

detecting an overheating condition related to at least one frequency range of the plurality of non-overlapping frequency ranges; and transmitting an information message to the network in response to the detected overheating condition, wherein the information message comprises a request for a capability reduction related to the at least one frequency range of the plurality of non-overlapping frequency ranges, wherein the request for capability reduction includes an indication that indicates capability reduction corresponding to each of the plurality of CCs of the frequency range for which the capability reduction is requested, and wherein the capability reduction involves reducing a maximum bandwidth for operation on the indicated frequency range for which the capability reduction is requested, wherein the maximum bandwidth for operation on the indicated frequency range refers to a maximum aggregated bandwidth across all carriers of the indicated frequency range.

2. The method of claim 1, further comprising: receiving a reconfiguration from the network for the UE to operate with a reduced capability related to the indicated frequency range for which the capability reduction is requested.

3. The method of claim 1, wherein the request includes a list of a plurality of requested reductions, wherein each of the plurality of requested reductions corresponds to each of the plurality of CCs, and wherein the indication comprises a position in the list of the plurality of requested reductions.

4. The method of claim 3, wherein the list of the plurality of requested reductions is ordered according to a configured order of operating CCs for the UE.

5. The method of claim 1, wherein the at least one frequency range of the plurality of frequency ranges comprises a millimeter-wave (mmWave) frequency range (FR2).

6. The method of claim 1, wherein the capability reduction involves reducing a number of component carriers for operation on the indicated frequency range for which the capability reduction is requested.

7. The method of claim 1, wherein the capability reduction involves reducing a MIMO rank for operation on the indicated frequency range for which the capability reduction is requested.

8. A User Equipment (UE), comprising:

one or more radio frequency (RF) modules that operate on a plurality of non-overlapping frequency ranges of a radio access technology (RAT) in a wireless communication network, wherein each frequency range covers a plurality of frequency bands for the operation in the same RAT by the UE, wherein each frequency band covers a plurality of component carriers (CCs), and wherein at least one CC covers a plurality of bandwidth parts (BWPs) in frequency domain, wherein each of the plurality of CCs of one of the plurality of non-overlapping frequency ranges have a shorter range and higher available channel bandwidth than each of the plurality of CCs of another one of the plurality of non-overlapping frequency ranges, and wherein the UE detects an overheating condition related to at least one frequency range of the plurality of non-overlapping frequency ranges; and a transmitter that transmits an information message to the network in response to the detected overheating condition, wherein the information message comprises a request for a capability reduction related to the at least one frequency range of the plurality of non-overlapping frequency ranges, wherein the request for capability reduction includes an indication that indicates capability reduction corresponding to each of the plurality of CCs of the frequency range for which the capability reduction is requested, and wherein the capability reduction involves reducing a maximum bandwidth for operation on the indicated frequency range for which the capability reduction is requested, wherein the maximum bandwidth for operation on the indicated frequency range refers to a maximum aggregated bandwidth across all carriers of the indicated frequency range.

9. The UE of claim 8, further comprising: a receiver that receives a reconfiguration from the network such that the UE operates with a reduced capability related to the indicated frequency range for which the capability reduction is requested.

10. The UE of claim 8, wherein the request includes a list of a plurality of requested reductions, wherein each of the plurality of requested reductions corresponds to each of the plurality of CCs, and wherein the indication comprises a position in the list of the plurality of requested reductions.

11. The UE of claim 10, wherein the list of the plurality of requested reductions is ordered according to a configured order of operating CCs for the UE.

12. The UE of claim 8, wherein the at least one frequency range of the plurality of frequency ranges comprises a millimeter-wave (mmWave) frequency range (FR2).

13. The UE of claim 8, wherein the capability reduction involves reducing a number of component carriers for operation on the indicated frequency range for which the capability reduction is requested.

14. The UE of claim 8, wherein the capability reduction involves reducing a MIMO rank for operation on the indicated frequency range for which the capability reduction is requested.

* * * * *